United States Patent
Janky et al.

(10) Patent No.: US 6,549,942 B1
(45) Date of Patent: *Apr. 15, 2003

(54) ENHANCED DELIVERY OF AUDIO DATA FOR PORTABLE PLAYBACK

(75) Inventors: James M. Janky, Los Altos, CA (US); Nathan Schulhof, Los Gatos, CA (US); Grant Jasmin, Sunnyvale, CA (US)

(73) Assignee: audiohighway.com, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/613,025

(22) Filed: Jul. 10, 2000

Related U.S. Application Data

(63) Continuation of application No. 09/124,584, filed on Jul. 29, 1998, now abandoned, which is a continuation-in-part of application No. 08/642,963, filed on May 7, 1996, now Pat. No. 5,841,979, which is a continuation-in-part of application No. 08/450,818, filed on May 24, 1995, now Pat. No. 5,914,941.

(51) Int. Cl.$^7$ .......................... G11B 20/10; H04M 11/00
(52) U.S. Cl. .................. 709/219; 709/227; 370/313; 370/486; 375/240; 725/70; 369/29.02
(58) Field of Search .................. 709/217–219, 709/237, 227–229; 375/240; 370/485, 486, 313; 434/308, 319; 705/26; 725/70, 91, 112, 114; 369/24.01, 25.01, 29.02; 704/270–278

(56) References Cited

U.S. PATENT DOCUMENTS

| | | | | |
|---|---|---|---|---|
| 4,639,225 A | * | 1/1987 | Washizuka | 434/308 |
| 5,132,992 A | * | 7/1992 | Yurt et al. | 375/240 |
| 5,233,333 A | * | 8/1993 | Borsuk | 345/660 |
| 5,550,863 A | * | 8/1996 | Yurt et al. | 375/240 |
| 5,631,693 A | * | 5/1997 | Wunderlich et al. | 348/7 |
| 5,790,423 A | * | 8/1998 | Lau et al. | 700/94 |
| 5,790,935 A | * | 8/1998 | Payton | 725/91 |
| 5,793,980 A | * | 8/1998 | Glaser et al. | 709/231 |
| 5,841,979 A | * | 11/1998 | Schulhof et al. | 709/217 |
| 5,914,706 A | * | 6/1999 | Kono | 345/173 |
| 5,914,941 A | * | 6/1999 | Janky | 370/313 |
| 6,002,720 A | * | 12/1999 | Yurt et al. | 375/240 |

* cited by examiner

Primary Examiner—Tuan Q. Dam
(74) Attorney, Agent, or Firm—Cooper & Dunham LLP; William E. Pelton; Donald S. Dowden

(57) ABSTRACT

A system for selection by a user and delivery to the user over an internetwork transmission channel of selected audio data files at a delivery rate of at least twice the delivery rate for normal, audibly perceptible playback of an audio data file. The user registers the user's selection of audio material with a central library of audio and/or text data files, and a digitized and optionally compressed omnibus file containing the user's selections is prepared and transmitted to the user at a high data transfer rate. The user receives downloads the selected data files to a personal computer or to a portable storage and playback unit (SPU) that may store and play back digitized text or audio data, using a docking station. The user carries this SPU until the user has an opportunity to audio process and play back the text or audio data files in audibly perceptible form.

23 Claims, 4 Drawing Sheets

| AUDIO/TEXT SOURCES | FIRST PROCESSING | SECOND PROCESSING (OPTIONAL) | SERVER TYPE | PLAYBACK |
|---|---|---|---|---|
| AUDIO FILE(S) | DIGITIZE | COMPRESSION, ENCRYPTION | AUDIO FILE(S) | AUDIO |
| TEXT FILE(S) | PASS-THROUGH | COMPRESSION, ENCRYPTION | TEXT FILE(S) | TEXT-TO-SPEACH +AUDIO |
| TEXT/VISUAL FILE(S) | SCANNING, OCR PROCESSING, DIGITIZATION | COMPRESSION, ENCRYPTION | TEXT FILE(S) | TEXT-TO-SPEACH +AUDIO |
| TEXT FILE(S) | DIGITIZATION, TEXT-TO-SPEACH CONVERSION | | AUDIO FILE(S) | AUDIO |
| TEXT/VISUAL FILE(S) | SCANNING, OCR, DIGITIZATION, TEXT-TO-SPEACH CONVERSION | | AUDIO FILE(S) | AUDIO |

FIG. 5

ENHANCED DELIVERY OF AUDIO DATA FOR PORTABLE PLAYBACK

This application is a continuation of patent application Ser. No. 09/124,584 filed Jul. 29, 1998, now abandoned, which is a continuation in part of a patent application entitled "Enhanced Delivery of Audio Data," U.S. Ser. No. 08/643,963, filed on May 7, 1996, now U.S. Pat. No. 5,841,979, which is a continuation in part of a patent application entitled "Portable Information Storage/Playback Apparatus Having A Universal Data Interface," U.S. Ser. No. 08/450,818, filed on May 24, 1995, now U.S. Pat. No. 5,914,941, both assigned to the Assignee of this application.

FIELD OF THE INVENTION

This invention relates to delivery of compressed digital audio data, potentially at rates much faster than the real time rate, for conversion to speech for portable audible reception in recreational or educational activities.

BACKGROUND OF THE INVENTION

Available information that is relevant to operation of a business or of a household increases at an exponential growth rate. A user of such information must become concerned with how to find the time, in an already crowded workday, to absorb the most relevant of such information. A menu of such information can be provided on a subscription basis, for individual selection by each user, as discussed in U.S. Ser. No. 08/643,963. One useful medium for delivery and reception of such information is sound, which requires use of the ears and of a portion of the user's brain but does not require simultaneous use of other senses. Previous systems have usually provided this information as a combination of video and audio in which the audio information was often treated as an afterthought.

The approaches disclosed by previous workers in this field usually combine video and audio data so that the video requirements control the choice of transmission system, or the selection of audio information is limited to features closely associated with use of a telephone. These approaches do not provide transmission and storage of a wide variety of audio-only information in a format that takes advantage of unique features of audio format information.

Also, these approaches do not take advantage of the possibility of using an available transmission medium, such as an internet that already provides for inter-communication between millions of homes, offices and other facilities. Use of a particular internet may reduce the number of signal formats that must be recognized and dealt with, and it may be possible to optimize the audio signal processing for the limited number of (or one) formats in which the audio signals are received.

What is needed is a procedure for packaging, delivery, reception, storage and playback of audio files in a format that (1) allows for potential transmission of the audio files at transfer rates many times higher than the normal audio playback rates, (2) allows receipt and storage of the audio files in compressed formats that can store several hours of normal audio programming in a playback medium of modest size, (3) allows transmission of audio files to the user at times and manners that are convenient for both the sender and the recipient, and (4) allows the user to conveniently transport the stored audio files, for playback at a time chosen by the user.

Preferably, the procedure should be adjustable to receive and process the audio (or text data) files using a signal processing procedure that is optimizable or optimized for the format, or limited number of formats, in which the audio (or text data) files are delivered to audio playback apparatus.

SUMMARY OF THE INVENTION

The invention meets these needs by providing a portable digital audio playback module for digital audio file receipt and storage, D/A conversion and playback. The audio programming material ("audio data files" herein) are digitized and optionally compressed before transfer over a hardwired or wireless communication internetwork channel to the storage/playback module, using any suitable compression algorithm. The module is capable of receiving and recording compressed, digitized audio programming at a transfer rate that may be faster than the normal audible playback rate so that, for example, ten hours of playback material may be transferred in a time interval of between less than ten minutes and a few hours, optionally using transfer procedures and times that do not interfere with the user's normal workday. The rate of data transfer depends upon the communications link used and will depend upon the Internet delivery rate vis-a-vis the playback rate. These communications links include POTS (plain old telephone service) lines, ISDN lines, cable television links, satellite broadcast links and other similar links that are suitable for internet communication. The audio data files are received by a user having a personal computer (notebook, laptop, desktop, etc.), modem, and docking station, and the audio data files are preferably processed and downloaded to a portable (e.g., handheld) storage and playback unit ("SPU") at the docking station. Once an audio data file is received by the user, this file can be decompressed and converted to analog format (optional) for playback at a normal rate by the user. The audio data files are received by the user and stored digitally on a non-volatile medium in an SPU, or in a personal computer ("PC") used to make an internet connection. The PC may also be used to play back or display the programming.

Alternatively, the PC or the SPU receives a text data file from the internetwork channel and either passes this file through a text-to-speech conversion process to convert this file to an audio data file, before the audio data file is received or stored or played back, or stores the file as a text file and converts this file to speech on the fly. Alternatively, the received data file can be processed and played back at the PC, rather than being downloaded to, and played back at, the SPU; most PCs have an audio sound system.

In contrast to a conventional digital audio storage system, such as Digital Audio Tape (DAT), the invention uses a different storage medium, provides random access search capability, rather than linear search capability, and optionally receives and stores information in a compressed format that uses a chosen data compression algorithm. In contrast to a writeable audio storage device, such as the Sony recordable mini-CD, the invention uses an SPU for download and playback and optionally may have intentionally limited audio bandwidth; stereo full fidelity is not needed for this programming.

The invention combines the remote data access capability resident in a personal computer, the portability of an SPU, and a set of tailored, streamlined control functions to simplify and automate a seamless process for selecting, receiving, storing and/or playing back audio data files, at times and places chosen by the user, with easily implemented control functions; and with a user interface that allows downloading of the compressed and digitized audio data files in a variety of formats. Storage for subsequent playback occurs first in the PC used to make an internet connection, but the files may be transferred automatically under software control, using a docking station, to the SPU.

BRIEF DESCRIPTION OF THE DRAWINGS

FIG. 5 is a table illustrating processing options for a data file taken from various sources before the data file is played back as an audibly perceptible signal.

DESCRIPTION OF BEST MODES OF THE INVENTION

Figure 1:
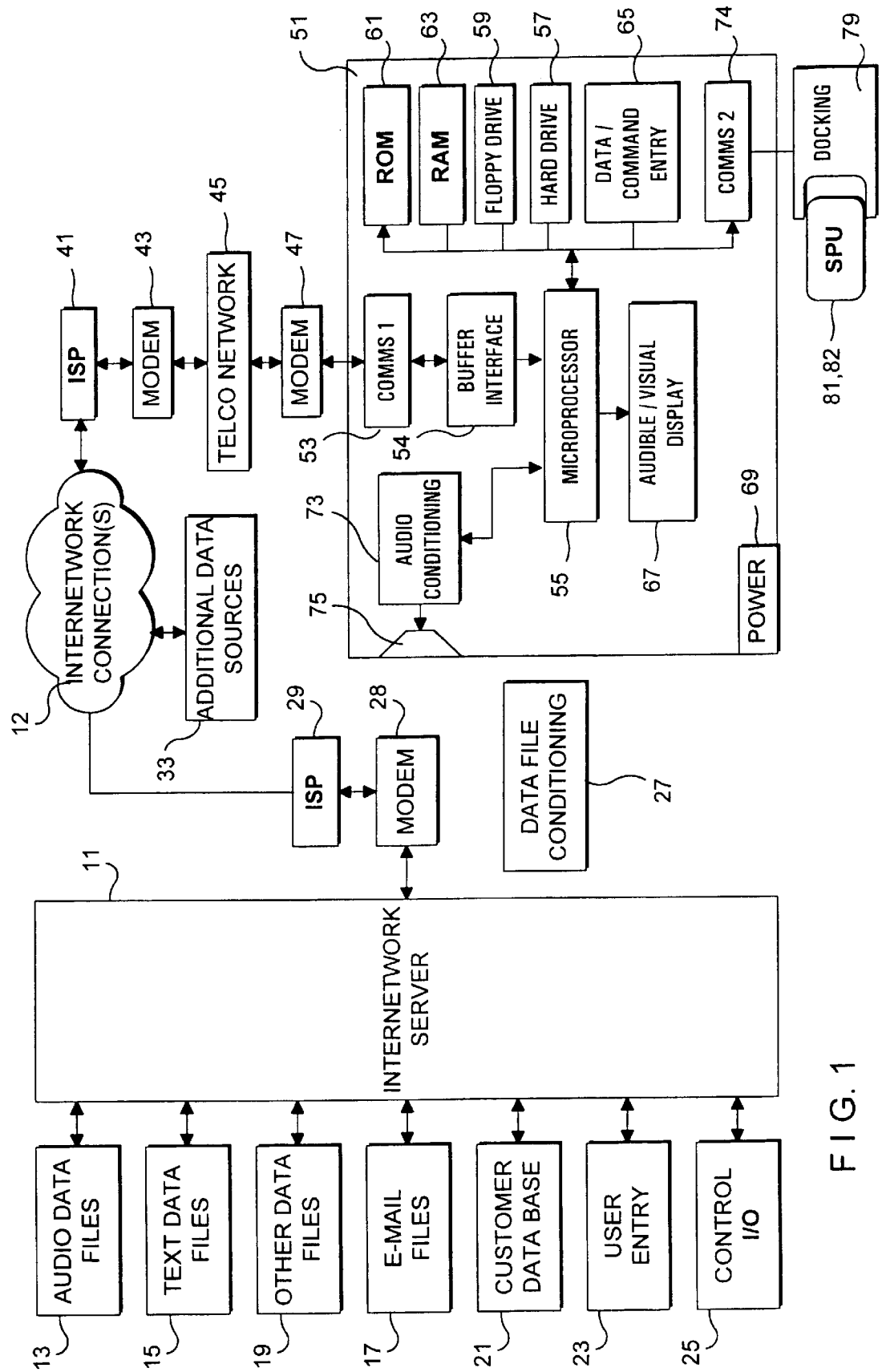
FIG. 1 illustrates a subscription/on-demand information delivery system, illustrating several embodiments of the invention.

FIG. 1 is a schematic view of an on-demand information delivery system 10 according to an embodiment of the invention. The system 10 is disclosed in part in the following issued patents, both of which are assigned to Information Highway Media Corporation, the assignee of the present application: N. Schulhof, J. Janky, "System for Distributing Subscription and On-Demand Audio Programming," U.S. Pat. No. 5,572,441; and N. Schulhof, J. Janky, "Apparatus for Distributing Subscription and On-Demand Audio Programming," U.S. Pat. No. 5,557,541.

An audio program distribution system 10 includes an internetwork server 11 that is connected to an internetwork channel 31, such as the well known Internet or an intra-net serving a smaller group of users. The server 11 is connected to a plurality of data sources, including an audio data file library 13, a text data file library 15, E-mail files 17 and other data files 19, and to a customer database 21 that contains relevant information on subscribers who use the distribution system 10. The server 11 also receives commands, data and other information from a user entry module 23, which may be a keyboard, light pen or other data/command entry device or may be an electronic terminal that communicates with a user terminal that may be nearby or remotely located. The server 11 also receives commands and other data from a control I/O module 25.

The audio data file library 13 and text data file library 15 may be implemented in any known digital storage technology, for example as a plurality of digital storage media, such as hard drives. Audio data material may be deposited in the library 13 from a variety of audio data sources using a variety of data communications media and formats from a plurality of locations, for example via modem transfer from a distributor, such as the Wall Street Journal. Sources for text data material are similarly voluminous. The audio data files and text data files are preferably digitized and optionally compressed and encrypted, using selected compression and encryption algorithms and formats, before such files are deposited in the data files libraries 13 and/or 15.

An analog audio intended for the internetwork channel 31 is passed through an audio conditioning module 27 (optional) for digitization, optional compression and/or optional encryption and is then passed through a first modem 28 to a first internetwork service provider ("ISP"; optional) 29 before being received by the internetwork channel 31. The internetwork channel 31 may be connected to, and receive data from, other data sources 33 as well. The data file(s) requested by a user are then received by a second ISP 41 (optional), by a second modem 43, by a telephone network 45 and by a third modem 47, before being received by a personal computer ("PC") or other computer-based module 51 utilized by a user.

One important anticipated use of the invention is to provide or implement an audio subscription service, using an internetwork channel to deliver selected audio or text data files that can be downloaded and stored for present or subsequent playback. For example, an audio program, created for radio or television, could be digitized and stored in an audio data file library for subsequent download and playback. Alternatively, selected portions of a daily newspaper, such as the Wall Street Journal or the New York Times, may be scanned in and digitized as an audio version, that is then delivered to the library. Used in this manner, the system 10 may provide daily delivery of a program in audio format that allows a subscriber to listen to the audio material without interruption by commercial breaks or other unwanted communications, that is not truncated to fit into a tight broadcast schedule, and that does not require dedication of the user's sense of sight, touch or other faculties, except for hearing. The user can, optionally, listen to the playback and simultaneously perform other tasks. During data transmission or downloading, audio program files can be transferred from the server 11 to the PC 51 at rates 2–100 times as large as the normal rates (_6–32 kilobits/sec) for real time playback of an audio data file, depending upon the present number of internetwork users.

The data file transmission channel is preferably an internetwork channel 31 capable of connecting hundreds, thousands or even millions of computer sites, including many sources of audio data files. The internetwork channel may, for example, be the World Wide Web that is part of the well known worldwide Internet. This Internet uses TCP/IP (transmission control protocol/internet protocol) or PPP (point-to-point protocol) in access to a website on the Internet. However, any other internet channel or intra-net channel, possibly using a different, but known, protocol, can also be used to gain access to an audio file database, to transmit selections based on on-line menus, and to receive and download and automatically store audio data files corresponding to those selections.

The internetwork channel 31 of the audio data delivery system 10 may be chosen to take advantage of any of several existing data delivery infrastructures for an internetwork. The delivery system 10 is well suited for use with data transmission means, such as plain old telephone service (POTS) or ISDN. Compression of the audio data files may be implemented by use of the G.722 or Dolby AC-2 or AC-3 compression schemes or by other suitable audio compression schemes. Alternatively, the audio data files may be delivered and received using the Ricochet wireless modem offered by Metricom (Los Gatos, Calif.).

The Ricochet system uses a wireless modem with RS-232 serial format and can transfer information at rates up to 128 kbits/sec, using a specially designed, wireless LAN Access Modem. The present modem rate limit is 28.8 kbits/sec. A dynamic address, which can change with each new session, is assigned to a Ricochet user. The Ricochet system acts as a network service provider with its own user pool and with connections to the Internet. Ricochet divides the 902–928 MHz unlicensed band into 162 channels, each 160 kHz wide, for operation. Maximum connect time per subscriber is 100 hours per month and 4 hours per individual session. A Ricochet modem should be within 450 meters (about 0.3 miles) peer-to-peer (another Ricochet modem) or within about 1600 meters of a Ricochet pickup node (located, for example, on selected telephone poles in many communities). E-mail service is available, using POP3 protocol. E-mail file attachments up to 5 Mbytes in size (total message length) can be transferred using Ricochet. San Francisco, Los Angeles, Seattle, Washington, D.C., major airports and many universities and large corporations are now covered by the Ricochet network, with other communities to be added in the coming years. A high speed network service will be added in 1999.

In practice of the invention, information is loaded into the PC or SPU through a modem 31, stored, and thereafter played back at a real time rate. The compression algorithms used in the herein-described system are similar (or may be identical) to those developed by the Motion Picture Experts Group, referred to as MPEG-1 and MPEG-2. Other known compression algorithms include G.722, pioneered by AT&T. These compression techniques provide specific algorithms in which audio is digitized and then compressed a great deal. Maximum compression achieved to date that maintains adequate quality programming is about 6–6.5 kilobits/sec. Typical compressed but high-quality audio data rates lie somewhere between 16 and 32 kilobits per second.

The internetwork channel 31 routes the selected audio and/or text data file(s) to the microprocessor 51 using any suitable communication means, as discussed above.

Communications protocols for implementing this service are available and well known in the art. Two examples are point-to-point protocol (PPP) and transmission control protocol/internet protocol (TCP/IP), used for communications on the Internet. The data transmission control process is well understood and is available in software as part of the products offered by Netscape, NetCom, America OnLine and Compuserve, among others. Terminal emulators, such as a microphone and PC phone are available and well known to users of personal computers (PCs). The expansion of Internet activity has led to widespread development of many such communications packages for use on PCs. By design, the transmission protocol used in the transmission and/or downloading channel 29 is matched by a similar protocol that resides in the subscriber's PC. Matching of these two protocols allows connection to a Website source for audio data files.

The data files are received at the PC 51 and buffered by a first communications terminal 53 and by a buffer and data interface 54 (optional) before receipt by a microprocessor 55 and are preferably stored in a hard drive 57 associated with the microprocessor 55. The PC 51 optionally includes a floppy drive and includes ROM 61, RAM 63, a data command entry module 65 for user communication with the PC, an audio/visual display module 67 and a source of electrical power 69. The data interface 54 may be configured to recognize only one or a few digital formats, such as those that would be presented by a connection to the Internet. Alternatively, the data interface 54 may be a universal data interface that recognizes any of a large number of digital formats that are used with various information packages (packets, frames, cells, etc.). A universal data interface is discussed in U.S. Ser. No. 08/643,963; this discussion is incorporated by reference herein.

Optionally, the microprocessor 55 is connected to, or includes, an audio processing module 73 and a loudspeaker or other audibly perceptible audio data file display 75. A text data file that arrives at the PC 51 must be converted to an audio data file before playback over the loudspeaker. If the data file is already in audio format, the audio processing module 73 and loudspeaker 75 may receive the converted audio data file (via a D/A converter) directly from the microprocessor 55, as shown. Optionally, software resident in the microprocessor 55 provides E-mail file interrogation and/or text-to-speech conversion for a received file.

An E-mail file will usually include a routing sub-message, appended as a header at the beginning (or as a trailer at the end) of the file, that specifies the route followed by the audio message in moving from the audio message source (the person or machine that left the message in E-mail form) to the intended recipient's telephone answering machine or service. These routing headers include specification of each bridge, router, gateway, etc. passed through by the E-mail message and can be quite long. In some instances, the length of a routing header can be many times the length of the useful part of the message. A routing header that requires 16 lines or more of text to print out is not unusual. The E-mail interrogation process examines the routing header, and any other header information that is specified by the user, is stripped from the message so that only the portion of the E-mail message that is of interest to the user is recorded in the computer hard drive 57 or on the storage and playback unit 81, discussed in the following.

The PC also includes a second communications module 77, connected to the hard drive 57 and to a docking station 79 that receives a portable, preferably handheld, storage and playback unit ("SPU") 81. The SPU 81 receives a download of one or more selected audio and/or text data files from the PC, for storage and present or subsequent playback of the selection(s). The audio and/or text data files are downloaded and stored on the SPU 81, preferably on a PCMCIA card with flash memory (referred to collectively as an "SPU" for convenience here). The characteristics of a PCMCIA card are discussed below.

An SPU 81 is inserted into the SPU docking station 79, and audio and/or text data files, selected from commands to the host PC, are transferred, in compressed or decompressed format, with or without encryption, onto the SPU for present or future playback. The SPU 81 is carried by the user until the user has an opportunity to play back part or all of the audio and/or text data files on the SPU.

Figure 2:
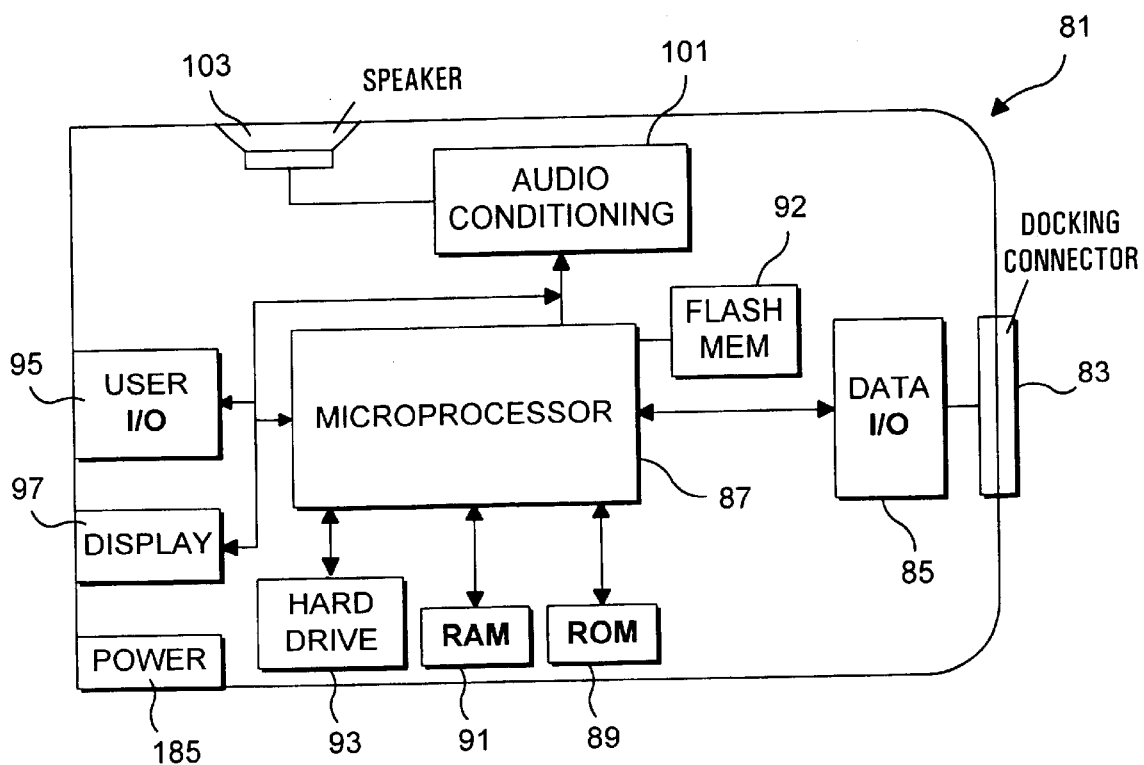
FIG. 2 is a schematic view of a portable storage and playback unit (SPU) that can be used to practice the invention.

In one embodiment, the SPU 81, shown in more detail in FIG. 2, includes a docking interface connector 83, software to implement data transfer from the docking station 79, a data I/O module 85 connected to the docking connector 83 and to an on-board microprocessor 87. The microprocessor is connected to a memory unit 82, such as flash memory, and to a ROM 89 and a RAM 91 and optionally includes a hard drive 93 for additional storage. The transfer commands reside in the host PC, where transfer is activated. Optionally, a user activates a user data/command module 95 and visual or audible display 97 to download data file selections to the SPU 81 and to cause playback of one or more of these selections.

If the downloaded data file is in text format, the data file is first passed through a text-to-speech conversion process (optional), which is preferably implemented in software. The converted data file, now in audio format, is passed through an audio processing module 101 to a loudspeaker or other audibly perceptible display 103 for playback. If the data file received at the SPU 81 is already in audio format, the text-to-speech conversion process is not needed, and the audio data file is converted from digital to analog format and passed directly to the audio processing module 101 and loudspeaker 103 for playback. The SPU 81 can be carried around in the hand, pocket or other receptacle until the user has an opportunity to play back one or more selections that have been downloaded to and stored in the SPU.

Figure 3:
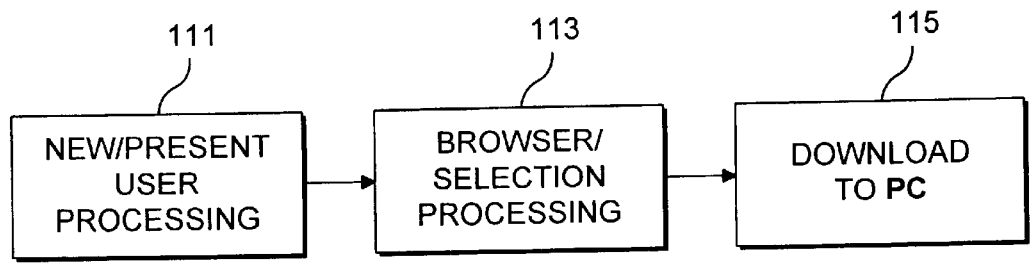
FIG. 3 illustrates a general procedure for user processing, data file(s) selection by the user, and downloading of the selected file(s) to a PC.

FIG. 3 illustrates a general procedure for user processing, data file(s) selection by the user, and downloading of the selected file(s) to a PC. If the user is not already registered with the system, the system interacts with the user in block 111 to obtain registration and to set up a subscription for the (new) user. If a user is already registered and active, the system checks the registration in block 111. If this registration is confirmed, the system allows the user to proceed to block 113 and to browse and indicate one or more audio or text selections for downloading. After the user indicates one or more selections, the system proceeds to block 115 and downloads these selections to the user's PC, using an internetwork channel for transmission of the selected data files.

Figure 4:
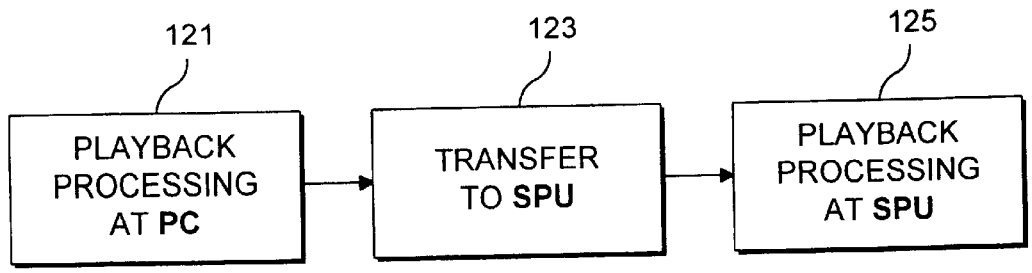
FIG. 4 illustrates a general procedure for playback processing of a data file at a PC, downloading of a data file to an SPU, and playback of the data file at the SPU.

FIG. 4 illustrates a general procedure for playback processing of a data file at a PC, downloading of a data file to an SPU, and playback of the data file at the SPU, after the selected data files have been downloaded to the user's PC. In block 121, the user has selected playback processing at the user's PC, and the selected data files are audio processed and playback at the PC for user-initiated playback at the PC. Alternatively, in block 123, the user has selected SPU playback, and the system transfers the selected data files to the SPU for storage. The selected (downloaded) data files are then audio processed at the SPU, in block 125, for user-initiated playback at the SPU.

FIG. 5 is a table illustrating processing options for a data file taken from various sources before the data file is played back as an audibly perceptible signal. In a first option, a selected data file is already in audio format. The data file is digitized (if this has not already been done) in a first processing step, then optionally compressed and/or encrypted for transmission to the user's PC as an audio format file. The received file is processed and played back by the user as an audio format file.

In a second format, the selected data file is in text format, and the file is passed through without further digitization and is optionally compressed and/or encrypted for transmission to the user's PC as a text format file. The received file is passed through a text-to-speech conversion process and is processed and played back by the user as an audio format file.

In a third format, the selected data file is available as a visual text file and is scanned, passed through optical character recognition ("OCR") processing and digitized in a first processing step. This produces a text data file. The selected file is optionally compressed and/or encrypted for transmission to the user's PC as a text format file. The received file is passed through a text-to-speech conversion process and is processed and played back by the user as an audio format file.

In a fourth format, the selected data file is in text format, and the file is digitized and passed through a text-to-speech conversion process in a first processing step. The data file is then optionally compressed and/or encrypted for transmission to the user's PC as an audio format file. The received file is processed and played back by the user as an audio format file.

In a fifth format, the selected data file is available as a visual text file and is scanned, passed through optical character recognition ("OCR") processing, digitized and passed through a text-to-speech conversion process in a first processing step. The selected file is optionally compressed and/or encrypted for transmission to the user's PC as an audio format file. The received file is processed and played back by the user as an audio format file.

Figure 6:
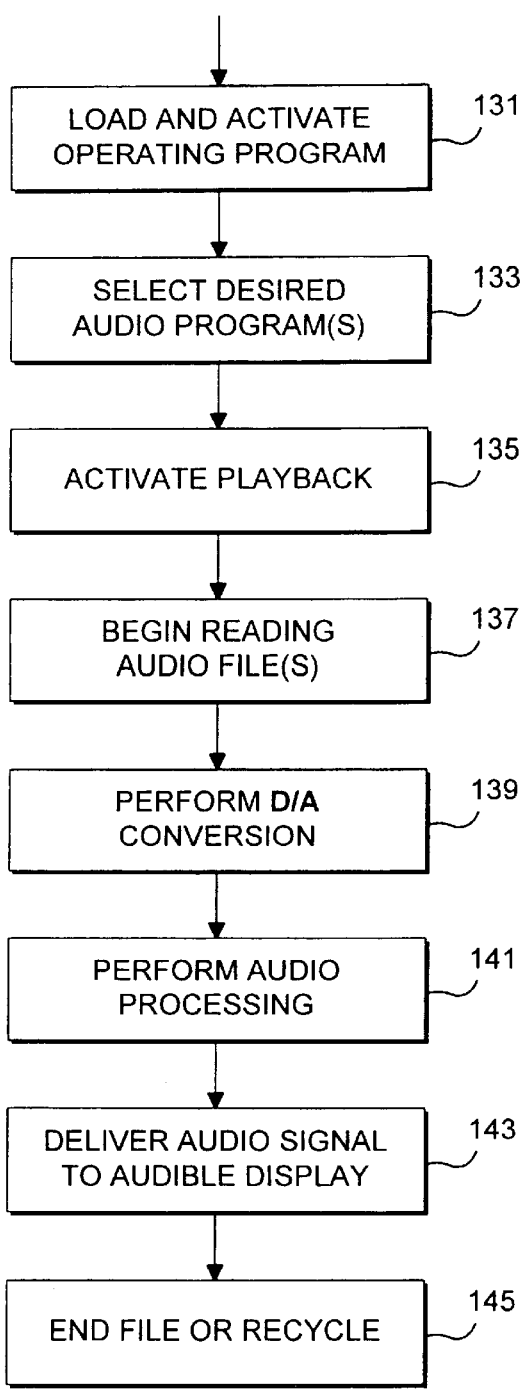
FIGS. 6 and 7 are flow charts illustrating the playback according to several embodiments.

FIG. 6 is a flow chart illustrating a playback procedure according to the invention, where the received data file is already in audio format. In step 131, the operating program is loaded and activated. In step 133, one or more stored audio data files is selected for playback. In step 135, playback is activated, and the operating program begins reading an audio data file, in step 137, and performs D/A conversion, in step 139. In step 141, the audio data file is passed through audio processing, and the audio processed data file is delivered to the loudspeaker for audible display (playback) in step 143. The system then ends playback or recycles for another audio data file selection in step 145.

Figure 7:
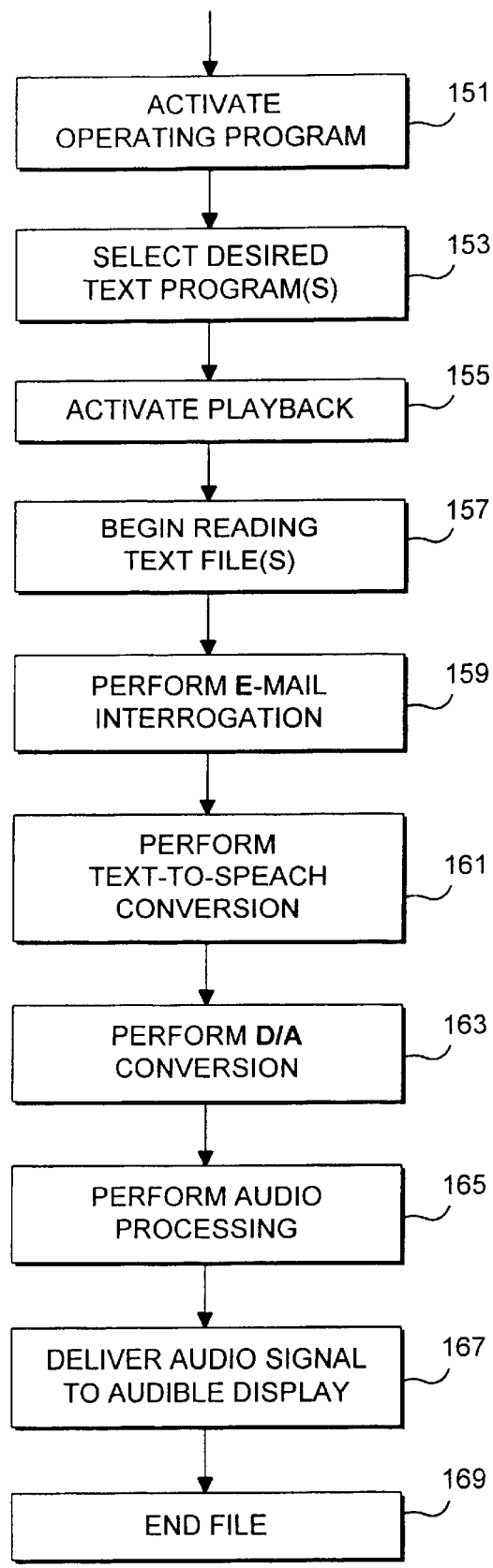

FIG. 7 is a flow chart illustrating a playback procedure according to the invention, where the received data file is in text format. In step 151, the operating program is loaded and activated. In step 153, one or more stored audio data files is selected for playback. In step 155, playback is activated, and the operating program begins reading a text data file, in step 157. In steps 159, 161 and 163, the system optionally performs E-mail file interrogation, text-to-speech conversion and D/A conversion. In step 165, the data file (now in audio format) is passed through audio processing, and the audio processed data file is delivered to the loudspeaker for audible display (playback) in step 167. The system then ends playback or recycles for another audio data file selection in step 169.

One embodiment of the SPU 81 and its memory unit 82 is a PCMCIA-type format card, with flash memory included in the PCMCIA card. The PCMCIA card, in its present design, is a 68-pin module, with plug-in being provided by pin-and-socket connectors, with the pins being arranged in two rows of 34 pins each. The card operates with a memory-only interface or with an input/output interface. In a memory-only configuration, the pin assignments include j ground pins (1_j_4), k $V_{cc}$ pins (1_k_2), data bit pins 0–15, address bit pins 0–25, m card enable pins (1_m_2), an output enable pin, a write enable pin, a card detect pin, a card reset pin, n programming supply voltage pins (1_n_3), and 7 special purpose pin assignments, including ready/busy pin, write protect pin, register select pin, supply voltage detect pins, write protect pin and reserved pins. In an input/output configuration, the special purpose pins become interrupt request, I/O port bit count (16-bit; yes/no), input port acknowledge, register select, I/O enable. audio digital waveform, card status changed, I/O read and I/O write.

An Execute-In-Place option allows a computer connected to the card to execute programs directly from instructions and/or data provided on the card.

The card uses 3.3 volts or 5 volts supply for $V_{cc}$ and provides 64 Mbytes of memory address space (SRAM, MaskPROM, OTPROM, EPROM, EEPROM or Flash Memory), with retrieval time of 100, 150, 200, 250 or 600 nsec. I/O registers for the PCMCIA card have either 8 bits or 16 bits width. The card thickness may be either 3.3 mm or 5 mm or 10 mm. Card length and width are approximately 85.6 mm and 54 mm, respectively.

The card has five layers of operation standardization. The lowest layer is physical and specifies electrical and card interface characteristics. The second layer, basic compatibility, specifies minimum memory size, minimum memory speed, data structures used, etc., optionally including specification of the Card Information Structure. The third layer, data recording format, specifies how card data are physically organized on the card (blocked vs. unblocked, with or without check sum included, etc.), analogous to format specifications of a floppy disk. The fourth layer, data organization, specifies how data are logically organized on the card, including the operating system used, whether the Execute-In-Place option is used, whether flash file memory is used, and application-specific information. The fifth layer specifies standards that are specific to a particular operating environment. Only compliance with the first two layers is required currently.

A Web page can be designed and implemented to allow a user to interact with the audio data file system and to download selections from an audio library. Design and implementation of a Web page is discussed, from different points of view, by Brian Pfaffenberger, *Publish It On The Web,* Academic Press, New York, Second Edition, 1997, by Roger C. Parker, *Guide To Web Content And Design,* MIS Press, Henry Holt & Co., New York, 1997, and by Andrew Sather et al in *Creating Killer Interactive Web Sites,* Adjacency, 1997. Design of an interactive server is discussed in detail by Stephen Walther in *Active Server Pages Unleashed,* Sams.net Publishing, Indianapolis, 1998, pp. 470–475 and elsewhere, and by Richard Wagner et al in *Java Script Unleashed,* Sams.net Publishing, Indianapolis, Second edition, 1997, pp. 338–359 and elsewhere.

What is claimed is:

1. Portable apparatus for accessing digital audio data stored at a remote location, the apparatus comprising:
   a storage unit for storing the data; and
   a playback unit for playing back the data;
   the apparatus being capable of communicating via a docking station with a computer connectable to a communications link for downloading the data from the remote location and uploading the data to the apparatus.

2. Apparatus according to claim 1 further comprising the computer and the communications link.

3. Apparatus according to claim 2 wherein the communications link comprises the Internet.

4. A method comprising the steps of:
   downloading to a computer digital audio data stored at a remote location;
   establishing via a docking station an upload connection between the computer and a portable unit having storage and playback capability; and
   uploading the data to the portable unit for storage therein.

5. A method according to claim 4 comprising the step of breaking the upload connection and playing back the data.

6. Audio information storage and playback apparatus comprising:
   a computer and associated data interface, programmed to receive and extract an audio data file from an incoming signal over an internetwork channel at a transfer rate that is greater than a playback rate for audibly perceptible playback of information contained in the data file; and
   a data transfer mechanism adapted for connection to the computer and to a playback module that receives and stores the data file from the computer and provides audibly perceptible playback of the data file, wherein said playback module further comprises:
   flash memory for receiving and storing said data file from said computer;
   a playback selection device to select and retrieve at least one selected data file recorded in the flash memory;
   a digital-to-analog conversion device to convert the selected data file into an audio signal; and
   an audio processing device to select and retrieve the selected data file from the flash memory and to reproduce the selected data file in audibly perceptible form for playback at a real time delivery rate.

7. The apparatus of claim 6, wherein said flash memory further comprises a PCMCIA card.

8. The apparatus of claim 6, wherein said playback module includes at least one of an audibly perceptible display and a visually perceptible display that displays user information from at least one of the following: (1) an estimated length of time required for real time playback of a user-specified selection recorded on said playback module; (2) a title or phrase describing a user-specified selection recorded on said playback module; and (3) a user-specified category to which a user-specified selection recorded on said playback module is assigned.

9. The apparatus of claim 6, further comprising:
   a keypad, having at least two keys thereon that are tactilely distinguishable or visually distinguishable, connected to said playback module, that allows a command to be entered that selects said selected data file and that causes said audio processing means to convert said selected data file to an audibly perceptible signal.

10. Audio information storage and playback apparatus comprising:
    a computer and associated data interface, programmed to receive and extract an audio data file from an incoming signal over an internetwork channel at a transfer rate that is greater than a playback rate for audibly perceptible playback of information contained in the data file; and
    a data transfer mechanism adapted for connection to the computer and to a playback module that receives and stores the data file from the computer and provides audibly perceptible playback of the data file, wherein said computer further comprises a data file interrogation module, for receiving and examining said data file to determine whether said data file contains at least one E-mail message, for removing the E-mail routing information for each E-mail message that is part of said data file, and for retaining the remainder of the E-mail in said data file.

11. Audio information storage and playback apparatus comprising:
    a computer and associated data interface, prograunmed to receive and extract an audio data file from an incoming signal over an internetwork channel at a transfer rate that is greater than a playback rate for audibly perceptible playback of information contained in the data file; and
    a data transfer mechanism adapted for connection to the computer and to a playback module that receives and stores the data file from the computer and provides audibly perceptible playback of the data file, wherein said audio data file is provided in digitized and compressed format using a compression algorithm drawn from the class of audio compression algorithms consisting of perceptual encoding, Dolby Labs AC-3 and CCITT recommendation G.722.

12. Audio information storage and playback apparatus comprising:
    a computer and associated data interface, programmed to receive and extract an text data file from an incoming signal over an internetwork channel, where the text data file is received by the computer at a transfer rate that is greater than a playback rate for audibly perceptible playback of information contained in the text data file; and
    a data transfer mechanism, adapted for connection to the computer and to a playback module that receives and stores the text data file from the computer and provides audibly perceptible playback of the text data file, further comprising said playback module, wherein said playback module comprises:
    flash memory for receiving and storing said text data file from said computer;
    a playback selection device to select and retrieve at least one selected data file recorded in the flash memory;
    a text-to-speech conversion device to receive at least one text data file from the playback selection device and to convert at least one text data file to an output signal that is in audio format;
    a digital-to-analog conversion device to convert the text-to-speech conversion means output signal into an audio signal; and
    an audio processing device to receive the digital-to-analog conversion means output signal and to reproduce the output signal in audibly perceptible form for playback at a real time delivery rate.

13. The apparatus of claim 12, where in said flash memory further comprises a PCMCIA card.

14. The apparatus of claim 12, wherein said playback module includes at least one of an audibly perceptible display and a visually perceptible display that displays user information from at least one of the following: (1) an estimated length of time required for real time playback of a user-specified selection recorded on said playback module; (2) a title or phrase describing a user-specified selection recorded on said playback module; and (3) a user-specified category to which a user-specified selection recorded on said playback module is assigned.

15. The apparatus of claim 12, further comprising:
   a keypad, having at least two keys thereon that are tactilely distinguishable or visually distinguishable, connected to said playback module, that allows a command to be entered that selects said selected text data file and that causes said audio processing means to convert said selected text data file to an audibly perceptible signal.

16. The apparatus of claim 12, wherein said playback module further comprises a text-to-speech conversion module that receives and converts said data file to an audio file.

17. The apparatus of claim 12, wherein said data interface is a universal data interface to receive a file as part of an incoming signal, tansmitted over an internetwork transmission channel, in digitized format, and to provide automatic data format recognition for this data file.

18. The apparatus of claim 12, wherein said computer comprises a data file interrogation module, for receiving and examining said data file to determine whether said data file contains at least one E-mail message, for removing the E-mail routing information for each Email message that is part of said data file, and for retaining the remainder of the E-mail in said data file.

19. The apparatus of claim 12, further comprising a telephone modem, connected to said data interface, for receiving and converting said incoming signals and for passing the converted incoming signals to said data interface.

20. The apparatus of claim 12, wherein said text data file is converted to a digitized and compressed audio format using a compression algorithm drawn from the class of audio compression algorithms consisting of perceptual encoding, Dolby Labs AC-3 and CCITT recommendation G.722.

21. Audio information storage and playback apparatus comprising:
   a computer and associated data interface, programmed to receive and extract an audio data file from an incoming signal over an internetwork channel at a transfer rate that is greater than a playback rate for audibly perceptible playback of information contained in the data file; and
   a data transfer mechanism adapted for connection to the computer and to a playback module that receives and stores the data file from the computer and provides audibly perceptible playback of the data file, wherein said transfer mechanism further comprises a docking station, connected to said computer and adapted for receiving a playback module that receives and stores said data file from the computer and provides audibly perceptible playback of said data file.

22. Audio information storage and playback apparatus comprising:
   a computer and associated data interface, programmed to receive and extract an text data file from an incoming signal over an internetwork channel, where the text data file is received by the computer at a transfer rate that is greater than a playback rate for audibly perceptible playback of information contained in the text data file; and
   a data transfer mechanism, adapted for connection to the computer and to a playback module that receives and stores the text data file from the computer and provides audibly perceptible playback of the text data file, wherein said transfer mechanism further comprises a docking station, connected to said computer and adapted for receiving a playback module that receives and stores said text data file from the computer and provides audibly perceptible playback of said text data file.

23. A system for receiving, storing and playing back digital files, the system comprising:
   a portable storage and playback device that receives and stores a digital file over an internetwork channel at a transfer rate that is greater than a playback rate for audibly perceptible playback of information contained in the data file;
   a personal computer that contains at least one digital file; and
   a transfer mechanism connected to the portable storage and playback device and including a signal connection for facilitating transfer of the digital file between the personal computer and the portable storage and playback device,
   wherein at least one of the personal computer and the portable storage and playback device includes software to facilitate a transfer of the digital file from the personal computer to the portable storage and playback device, using the connection between the personal computer and the transfer mechanism, and the portable playback and storage device is removed from the transfer mechanism for playback of the digital file,
   wherein said transfer mechanism comprises a docking station connected to said portable storage and playback device and includes said signal connection between said personal computer and said portable storage and playback device.

* * * * *